US006965608B1

(12) United States Patent
Aiyagari et al.

(10) Patent No.: US 6,965,608 B1
(45) Date of Patent: Nov. 15, 2005

(54) METHOD AND APPARATUS FOR TRANSMITTING DATA IN A PUBLIC NETWORK

(75) Inventors: Sanjay Aiyagari, Santa Clara, CA (US); Mick Henniger, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/107,230

(22) Filed: Jun. 30, 1998

(51) Int. Cl.[7] .............................. H04J 1/00; H04J 3/12; H04J 3/16
(52) U.S. Cl. ...................... 370/465; 370/485; 370/493; 370/523
(58) Field of Search .............................. 370/465, 466, 370/470, 472, 476, 484, 545, 203, 210, 522, 370/523, 467, 350, 259, 261–263, 265, 266, 370/271, 480, 485, 493; 375/260, 222

(56) References Cited

U.S. PATENT DOCUMENTS

| 5,533,028 A | * | 7/1996 | Hita de la Torre et al. . | 370/350 |
| 5,598,413 A | * | 1/1997 | Sansom et al. ............. | 370/468 |
| 5,751,723 A | * | 5/1998 | Vanden Heuvel et al. .. | 370/528 |
| 5,809,033 A | * | 9/1998 | Turner et al. ............... | 370/522 |
| 5,903,567 A | * | 5/1999 | Alger-Meunier ............ | 370/468 |
| 5,930,312 A | * | 7/1999 | Marum ........................ | 375/377 |
| 5,940,403 A | * | 8/1999 | Williams .................... | 370/465 |
| 6,118,766 A | * | 9/2000 | Akers ......................... | 370/249 |
| 6,246,695 B1 | * | 6/2001 | Seazholtz et al. ........... | 370/468 |

OTHER PUBLICATIONS

Advance Information of Bt8970, *Single-Chip HDSL Transceiver*; Brooktree Division of Rockwell Semiconductor Systems, Inc.; Dec. 1996.
Advance Information of Bt8953A, *HDSL Channel Unit*; Brooktree Corporation; Dec. 1996.
*Transmission and Multiplexing (TM); High Bit Rate Digital Subscriber Line (HDSL) Transmission System on Metallic Local Lines; HDSL Core Specification and Applications for 2 048 kbit/s Based Access Digital Sections*, European Telecommunications Standards Institute; ETR 152, Dec. 1996.

* cited by examiner

*Primary Examiner*—Ricky Ngo
*Assistant Examiner*—Soon D. Hyun
(74) *Attorney, Agent, or Firm*—Beyer, Weaver & Thomas, LLP.

(57) ABSTRACT

A method and apparatus are described for transmitting data in a network between first and second single-line digital subscriber line (SDSL) modems using a standard high data rate digital subscriber line (HDSL) frame format. The frame format includes at least one field in each data payload block, e.g., the F/Z bit field, for implementing a feature relating to one of the T1 and E1 transmission protocols. According to the invention, the at least one field is employed for transmission of selected payload data.

9 Claims, 3 Drawing Sheets

METHOD AND APPARATUS FOR TRANSMITTING DATA IN A PUBLIC NETWORK

BACKGROUND OF THE INVENTION

The present invention relates to transmission of data on a subscriber loop in a public network such as, for example, a telephone network. More specifically, the present invention provides an improvement of standard single-line digital subscriber line (SDSL) technology.

A wide variety of technologies and transmission standards have been developed for transmission of data via currently existing public network resources. The term "digital subscriber line" refers to a modem or modem pair connected by one or more twisted pairs having a specific data frame format and associated transmission rate. The first digital subscriber line technology, referred to as IDSL, corresponds to what is also known as basic rate ISDN. IDSL technology transmits duplex data at 144 kbps over copper lines using a 2B1Q modulation scheme. The modems multiplex and demultiplex the data stream into two B channels (64 kbps each) and a D channel (16 kbps) as described in ANSI T1.601, the entirety of which is incorporated herein by reference for all purposes.

High data rate digital subscriber lines (HDSL) are related to the earlier IDSL using the same modulation scheme to transmit data at the T1 data rate over two twisted pairs as described in ANSI Committee T1 TR-28 and ETR 152, the entireties of which are incorporated herein by reference for all purposes. A single line digital subscriber line (SDSL) is a single pair version of HDSL, i.e., transmitting data at one-half the T1 data rate, i.e., 768 kbps, over a single twisted pair.

For both HDSL and SDSL and as shown in FIG. 1, data are organized into 6 ms frames 102 comprising alternating overhead and payload sections 104 and 106. The four payload sections 106 each include twelve 97-bit payload blocks 108, 96 bits (110) of which are data and one bit (112) of which is known as the F/Z bit. This works out to the well known SDSL data rate of 768 kbps. Overhead sections 104 along with bits 112 represent an additional 16 kbps for an actual line rate of 784 kbps.

FIG. 2 is a simplified block diagram of a standard SDSL 202 connecting a central office or public branch exchange (represented by modem 204) and a subscriber premises (represented by modem 206). The data to be transmitted enters framing circuitry 208 of modem 204 at the raw data rate of 768 kbps. Framing circuitry 208 organizes the incoming data stream into the 6 ms frames described above with reference to FIG. 1 using a 768 kHz oscillator 210 and frame overhead data generated at 16 kbps. The framed data are then sent to bit pump 212 where, using a 784 kHz oscillator 214, they are encoded according to the 2B1Q modulation scheme and transmitted via twisted pair 216 to the subscriber premises as represented by modem 206.

At the subscriber premises, the modulated framed data are received at the rate of 784 kbps and demodulated by bit pump 218 which is clocked by a 784 kHz oscillator 220. The demodulated data are then received by framing circuitry 222 which strips off the 16 kbps frame overhead data and decomposes the 6 ms HDSL frames into a 768 kbps data stream. Framing circuitry 222 is clocked by a phase-locked loop (PLL) recovered clock (PLL circuitry 224) derived from the incoming data stream.

The F/Z bit in each payload block (field 112 of FIG. 1) is reserved for use with standard T1 and E1 for loop identification and out-of-band signaling for the transmission of special alarm codes which are only applicable to T1 and E1 transmissions. When standard framing circuitry receives a standard frame, the F/Z bit information is written to an F/Z bit register associated with the framing circuitry. If the transmission is a T1 or E1 transmission, the F/Z bit data are then used in accordance with their intended purpose according to well known techniques. However, when a data frame is on a network link which uses only SDSL technology and does not interface with T1 or E1 technology, the F/Z bit register and the data stored therein are ignored representing 8 kbps of wasted bandwidth. This may seem a relatively small amount of bandwidth with reference to the standard rate of 768 kbps. However, when viewed relative to the subject matter described in commonly assigned, copending U.S. Patent Application Ser. No. 09/107,840 for METHODS AND APPARATUS FOR TRANSMITTING DATA IN A PUBLIC NETWORK filed simultaneously herewith, the entire specification of which is incorporated herein by reference for all purposes, such a small bandwidth increase becomes more important. That is, the above-referenced copending application describes methods and apparatus by which the current HDSL data transmission infrastructure may be leveraged to provide lower effective data rates than the standard 768 kbps without sacrificing the advantages of the standard frame format. At the lower transmission rates made possible by those techniques, an extra 8 kbps could prove extremely valuable.

It is therefore desirable to provide data transmission techniques which avoid wasting this valuable data bandwidth on SDSL transmission links while retaining the compatibility advantages of the standard frame.

SUMMARY OF THE INVENTION

According to the present invention, the F/Z bits in the payload blocks of standard HDSL frames are used to transmit data over SDSL links which do not interface with T1 or E1 links, i.e., links on which the F/Z bits are employed for their intended purpose. Instead of ignoring the F/Z bit data and the F/Z bit registers, the present invention uses them for an additional 8 kbps of data throughput. As discussed above, this is a fairly small incremental improvement relative to a data rate of 768 kbps. However, when viewed relative to the variety of SDSL data rates made possible by the techniques described in the above-referenced patent application, an additional 8 kbps can provide an even higher degree of flexibility for service providers with regard to the number of data rate options they can offer subscribers. Moreover, as mentioned above, an 8 kbps increase in data throughput is much more significant for the lower SDSL data rates made possible by such technology.

Thus, the present invention provides a method and apparatus for transmitting data in a network between first and second single-line digital subscriber line (SDSL) modems using a standard high data rate digital subscriber line (HDSL) frame format. The frame format includes at least one field in each data payload block, e.g., the F/Z bit field, for implementing a feature relating to one of the T1 and E1 transmission protocols. According to the invention, the at least one field is employed for transmission of selected payload data.

According to a specific embodiment, selected payload data are taken from the data stream received by the first SDSL modem and stored in a register associated therewith. The register corresponds to the T1/E1 protocol feature. The selected payload data in the register are then used to generate a sequence of data frames wherein the selected payload data occupy the at least one field in the data payload blocks.

According to another embodiment, selected payload data are taken from the at least one field in the payload blocks of the sequence of data frames received by the second SDSL modem and stored in a register associated therewith. The register corresponds to the T1/E1 protocol feature. The selected payload data in the register are then inserted into the data stream A further understanding of the nature and advantages of the present invention may be realized by reference to the remaining portions of the specification and the drawings.

DESCRIPTION OF SPECIFIC EMBODIMENTS

Figure 3:
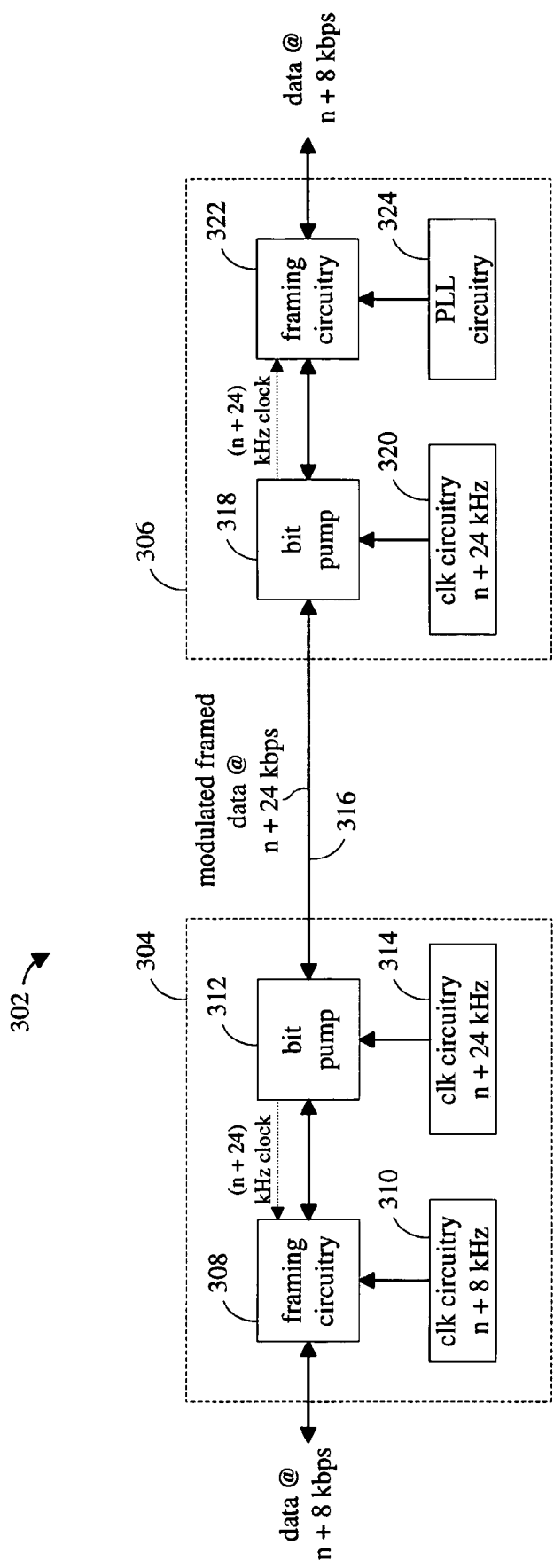
FIG. 3 is a simplified block diagram of an SDSL connecting a central office or public branch exchange and a subscriber premises according to a specific embodiment of the invention.

FIG. 3 is a simplified block diagram of an SDSL 302 connecting a central office or public branch exchange (represented by modem 304) and a subscriber premises (represented by modem 306) according to a specific embodiment of the invention. According to a specific embodiment, the data to be transmitted enters framing circuitry 308 at the raw data rate of 776 kbps, i.e., 8 kbps more than the standard HDSL rate of 768 kbps. It will be understood however that, according to the techniques described in the above-referenced copending application and as noted in FIG. 3, data may enter the subscriber loop at a variety of rates, i.e., (n+8) kbps, where n represents a data rate without the improvement described herein, without departing from the scope of the present invention. That is, the present invention may be used to increase by 8 kbps the data throughput for any SDSL transmission link regardless of the data rate (n) of that link without the improvement. According to specific embodiments of the invention, framing circuitry 308 may be based on, for example, the Brooktree Bt8953A Channel Unit or the Level One SK70720 MDSL Framer chip.

Figure 1:
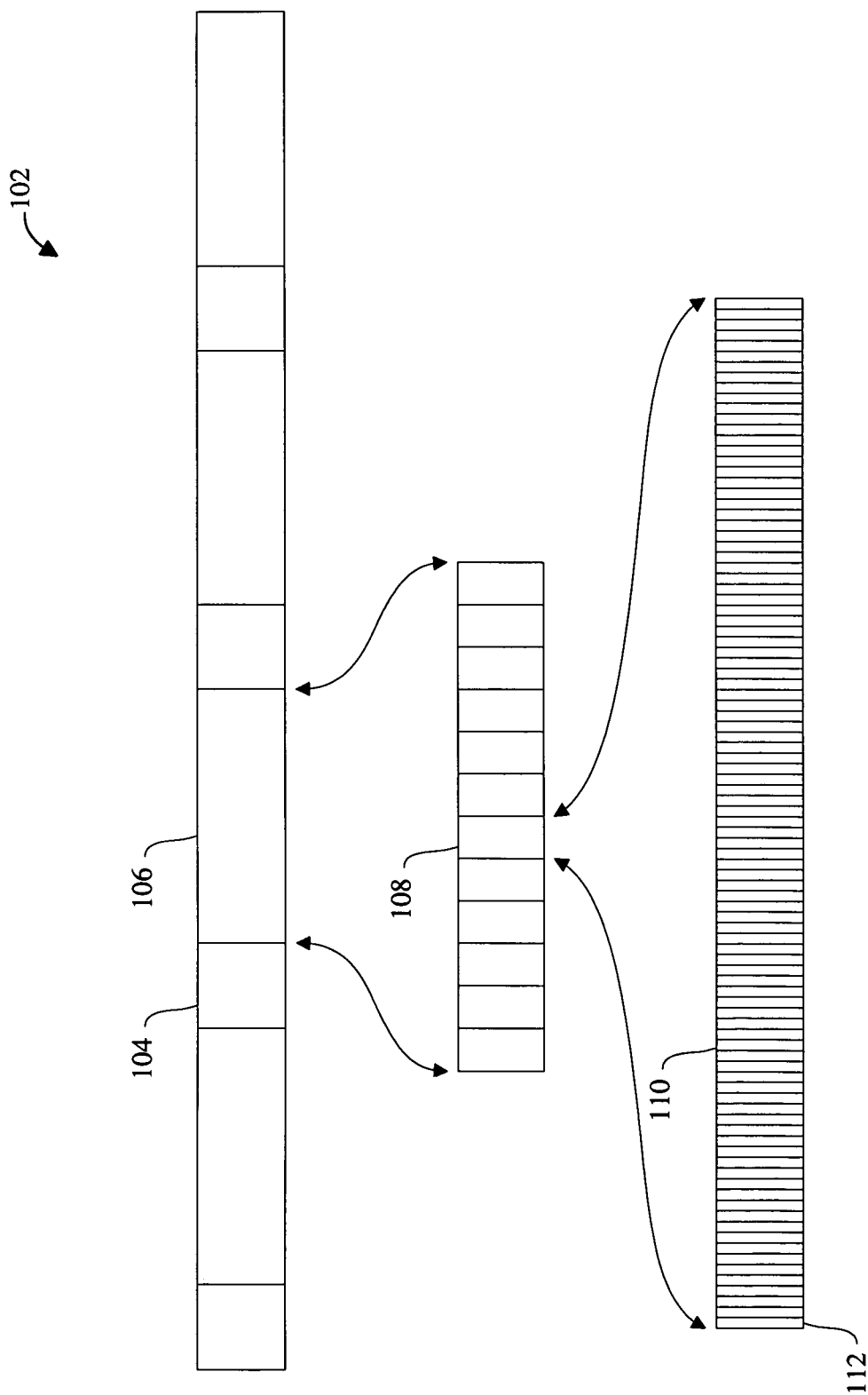
FIG. 1 is a simplified block diagram of a standard HDSL frame format.
Figure 2:
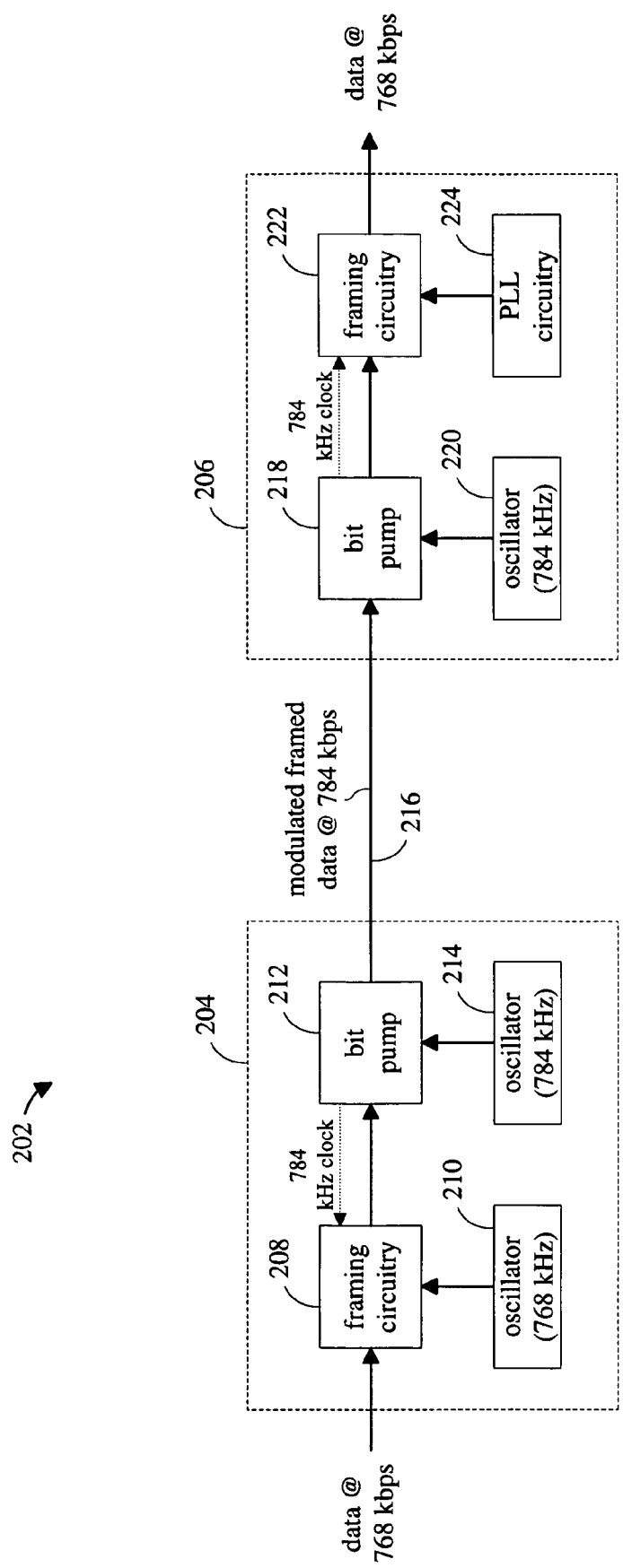
FIG. 2 is a simplified block diagram of a standard SDSL connecting a central office or public branch exchange and a subscriber premises.

Using 16 kbps of frame overhead data, framing circuitry 308 organizes the incoming data stream into frames which are structured similarly to those described above with reference to FIG. 1 with an important distinction. Some of the bits in the incoming raw data stream are directed to the F/Z bit register associated with framing circuitry 308. This is accomplished using the flexible programmable features of the framing circuitry chip set. This is possible due to the fact that, because SDSL technology makes no use of this register, there is no competing F/Z bit data to be stored in the register. Then, because these bits are in the F/Z bit register, they are included in the data frames generated by framing circuitry 308 in the F/Z bit slot in each of the frame's payload blocks. That is, the data bits stored in the F/Z bit register occupy the same position in the generated data frames as the F/Z bits would have occupied if the data were being transmitted according to the T1 or E1 protocol.

Thus, according to the invention, a higher effective data rate is made possible while keeping all frame parameters the same as for standard HDSL/SDSL transmission. Maintaining the standard frame helps to ensure that the transmitted frames are compatible with any hardware they are likely to encounter. Framing circuitry 308 employs clock circuitry 310 to synchronize with the incoming data stream. Clock circuitry 310 may be implemented in a variety of ways. According to specific embodiments, clock circuitry 310 is implemented as described in the above-referenced copending patent application.

The framed data are then sent to bit pump 312 where, using clock circuitry 314, they are encoded according to the 2B1Q modulation scheme and transmitted via twisted pair line 316 to the subscriber premises as represented by modem 306. Clock circuitry 314 generates a clock signal which is 16 kHz greater than the frequency generated by clock circuitry 310 to account for the 16 kbps of frame overhead. This is denoted with the term (64n+24) kHz. As discussed above with reference to clock circuitry 310, clock circuitry 314 may be implemented according to a variety of techniques.

According to a specific embodiment, clock circuitry 310 and 314 are provided according to the techniques described in commonly assigned, copending U.S. patent Application Ser. No. 09/109,991, U.S. Pat. No. 6,195,385, for HTU-C CLOCKING FROM A SINGLE SOURCE filed simultaneously herewith, the entire specification of which is incorporated herein by reference for all purposes.

At the subscriber premises, the modulated framed data are received and demodulated by bit pump 318 which is clocked by clock circuitry 320 at the same rate as clock circuitry 314. As with clock circuitry 310 and 314, clock circuitry 320 may be implemented according to a variety of techniques. The demodulated data are then received by framing circuitry 322 which strips off the 16 kbps frame overhead data and decomposes the 6 ms HDSL frames into the original n+8 kbps data stream. Framing circuitry 322 is clocked by a phase-locked loop (PLL) recovered clock (PLL circuitry 324) derived from the incoming data stream.

Framing circuitry 322 may be based on the HDSL chips sets described above with reference to framing circuitry 308. As with framing circuitry 308, the chip set upon which framing circuitry 322 is based is programmed to use rather than ignore the F/Z bit data. The F/Z bit data is stored in the F/Z bit register and then inserted into the reconstructed data stream. Again, this is made possible by the flexible programmability of the chip set upon which framing circuitry 322 is based.

While the invention has been particularly shown and described with reference to specific embodiments thereof, it will be understood by those skilled in the art that changes in the form and details of the disclosed embodiments may be made without departing from the spirit or scope of the invention. For example, one specific embodiment described above results in a data rate of 776 kbps, i.e., 8 more than the HDSL standard of 768 kbps. It will be understood, however, that the present invention may be employed to achieve an 8 kbps increase over the other HDSL standard rates of 1152 and 2304 kbps, i.e., 1160 and 2312 kbps, respectively. Therefore, the scope of the invention should be determined with reference to the appended claims.

What is claimed is:

1. A method for transmitting payload data in a network between fast and second single-line digital subscriber line (SDSL) modems using a standard high data rate digital subscriber line (HDSL) frame format, the frame format including an F/Z bit field in each payload block for enabling a feature corresponding to one of T1 and E1 transmission protocols and not conventionally used for transmitting the payload data, the method comprising directing selected bits of the payload data to an F/Z bit register, and automatically inserting one of the selected bits from the F/Z bit register into the F/Z bit field in every frame.

2. The method of claim 1 further comprising:
receiving the payload data as a data stream with the first SDSL modem;
generating a sequence of data frames in the HDSL frame format with the first SDSL modem; and
transmitting the sequence of data frames to the second SDSL modem.

3. The method of claim 1 further comprising:
receiving the payload data as a sequence of data frames in the HDSL frame format from the first SDSL modem with the second SDSL modem; and
decomposing the sequence of data frames into a data stream with the second SDSL modem.

4. The method of claim 1 wherein the network comprises a public telephone network, the first SDSL modem being associated with a central office and the second SDSL modem being associated with a subscriber premises.

5. The method of claim 1 wherein the network comprises a public telephone network, the first SDSL modem being associated with a subscriber premises and the second SDSL modem being associated with a central office.

6. A single-line digital subscriber line (SDSL) modem for transmitting a sequence of data frames including payload data according to a standard high data rate digital subscriber line (HDSL) frame format, the frame format including an F/Z bit field in each payload block for enabling a feature corresponding to one of T1 and E1 transmission protocols and not conventionally used for transmitting the payload data, the modem comprising:
framing circuitry for receiving an incoming data stream and generating the sequence of data frames, the framing circuitry directing selected bits of the payload data to an F/Z bit register, and automatically inserting one of the selected bits from the F/Z bit register into the F/Z bit field in every frame; and
modulation circuitry for modulating and transmitting the sequence of data frames.

7. A single-line digital subscriber line (SDSL) modem for receiving a sequence of data frames including payload data in a standard high data rate digital subscriber lie (HDSL) frame format, the frame format including an F/Z bit field in each payload block for enabling a feature corresponding to one of T1 and E1 transmission protocols and not conventionally used for transmitting the payload data, the modem comprising:
demodulation circuitry for receiving and demodulating the sequence of data frames; and
framing circuitry for receiving the demodulated sequence of data frames and generating a data stream, the framing circuitry directing bits in the F/Z bit field of the demodulated sequence to an F/Z bit register, and automatically inserting one of the bits from the F/Z bit register into the data stream for every frame.

8. An apparatus for transmitting data in a network between first and second single-line digital subscriber line (SDSL) modems using a standard high data rate digital subscriber line (HDSL) frame format, the frame format including an F/Z bit field in each payload block for enabling a feature corresponding to one of T1 and E1 transmission protocols and not conventionally used for transmitting the payload data, the apparatus comprising framing circuitry programmed to direct selected bits of the payload data to an F/Z bit register, and automatically insert one of the selected bits from the F/Z bit resister into the F/Z bit field in every frame.

9. At least one computer readable medium having computer program instructions stored therein for causing a network device to transmit data in a network between first and second single-line digital subscriber line (SDSL) modems using a standard high data rate digital subscriber line (HDSL) frame format, the frame format including an F/Z bit field in each payload block for enabling a feature corresponding to one of T1 and E1 transmission protocols and not conventionally used for transmitting the payload data, the computer program instructions comprising first instructions for direct selected bits of the payload data to an F/Z bit register, and automatically insert one of the selected bits from the F/Z bit into the F/Z bit field in every frame.

* * * * *